US012494197B2

(12) United States Patent
Shin

(10) Patent No.: US 12,494,197 B2
(45) Date of Patent: Dec. 9, 2025

(54) SPEECH RECOGNITION USING WORD OR PHONEME TIME MARKERS BASED ON USER INPUT

(71) Applicant: Google LLC, Mountain View, CA (US)

(72) Inventor: Dongeek Shin, San Jose, CA (US)

(73) Assignee: Google LLC, Mountain View, CA (US)

( * ) Notice: Subject to any disclaimer, the term of this patent is extended or adjusted under 35 U.S.C. 154(b) by 386 days.

(21) Appl. No.: 18/161,871

(22) Filed: Jan. 30, 2023

(65) Prior Publication Data

US 2023/0306965 A1 Sep. 28, 2023

Related U.S. Application Data

(60) Provisional application No. 63/267,436, filed on Feb. 2, 2022.

(51) Int. Cl.
*G10L 15/26* (2006.01)
*G10L 15/08* (2006.01)
(Continued)

(52) U.S. Cl.
CPC .............. *G10L 15/20* (2013.01); *G10L 15/08* (2013.01); *G10L 15/22* (2013.01); *G10L 25/87* (2013.01);
(Continued)

(58) Field of Classification Search
None
See application file for complete search history.

(56) References Cited

U.S. PATENT DOCUMENTS 8,712,770 B2 * 4/2014 Fukuda .................. G10L 21/02
704/226
11,398,230 B2 * 7/2022 Jang ....................... G06F 3/0485
(Continued)

FOREIGN PATENT DOCUMENTS

EP 1739546 A2 1/2007
EP 2683147 A1 1/2014
(Continued)

OTHER PUBLICATIONS

International Search Report and Written Opinion for the related Application No. PCT/US2023/061610, dated May 8, 2023, 93 pages.
(Continued)

*Primary Examiner* — Seong-Ah A Shin
(74) *Attorney, Agent, or Firm* — Honigman LLP; Brett A. Krueger; Grant Griffith

(57) ABSTRACT

A method for separating target speech from background noise contained in an input audio signal includes receiving the input audio signal captured by a user device, wherein the input audio signal corresponds to target speech of multiple words spoken by a target user and containing background noise in the presence of the user device while the target user spoke the multiple words in the target speech. The method also includes receiving a sequence of time markers input by the target user in cadence with the target user speaking the multiple words in the target speech, and correlating the sequence of time markers with the input audio signal to generate enhanced audio features that separate the target speech from the background noise in the input audio signal. The method also includes processing, using a speech recognition model, the enhanced audio features to generate a transcription of the target speech.

26 Claims, 4 Drawing Sheets

(51) Int. Cl.
*G10L 15/20* (2006.01)
*G10L 15/22* (2006.01)
*G10L 25/87* (2013.01)
(52) U.S. Cl.
CPC .. *G10L 2015/088* (2013.01); *G10L 2015/223* (2013.01)

(56) References Cited

U.S. PATENT DOCUMENTS

| | | | |
|---|---|---|---|
| 12,039,098 B2* | 7/2024 | Lee | G01S 5/02 |
| 2004/0049388 A1 | 3/2004 | Roth et al. | |
| 2010/0241963 A1* | 9/2010 | Kulis | G06F 16/685 |
| | | | 707/706 |
| 2012/0245936 A1* | 9/2012 | Treglia | G06F 16/685 |
| | | | 704/235 |
| 2014/0012587 A1* | 1/2014 | Park | H04W 12/50 |
| | | | 704/275 |
| 2014/0229167 A1* | 8/2014 | Wolff | G10L 15/26 |
| | | | 704/211 |
| 2014/0278441 A1 | 9/2014 | Ton et al. | |
| 2016/0275954 A1* | 9/2016 | Park | G10L 15/20 |
| 2017/0069321 A1 | 3/2017 | Toiyama | |
| 2019/0268465 A1* | 8/2019 | Broidy | G06F 16/685 |
| 2020/0105264 A1* | 4/2020 | Jang | G06F 3/0485 |
| 2020/0243072 A1* | 7/2020 | Park | G10L 15/08 |
| 2021/0020181 A1* | 1/2021 | Gorny | H04M 3/568 |
| 2021/0249027 A1 | 8/2021 | Zeghidour et al. | |
| 2021/0389868 A1* | 12/2021 | Crowder | H04N 21/4131 |
| 2022/0293125 A1* | 9/2022 | Maddika | G10L 25/51 |
| 2023/0018784 A1* | 1/2023 | Lee | H04W 4/80 |
| 2023/0035941 A1* | 2/2023 | Herman | G10L 15/25 |
| 2023/0215439 A1* | 7/2023 | Kanda | G10L 17/04 |
| | | | 704/235 |
| 2023/0237266 A1* | 7/2023 | Hoarau | G10L 15/22 |
| | | | 704/9 |
| 2023/0298612 A1* | 9/2023 | Caroselli | G10L 15/22 |
| | | | 704/202 |
| 2023/0368812 A1* | 11/2023 | Marchi | G06T 7/70 |
| 2024/0055017 A1* | 2/2024 | Maddika | G06F 40/216 |
| 2024/0257836 A1* | 8/2024 | Sexton | G06F 40/205 |

FOREIGN PATENT DOCUMENTS

| | | |
|---|---|---|
| JP | S6184771 A | 4/1986 |
| JP | S62166399 A | 7/1987 |
| JP | 2001142485 A | 5/2001 |
| WO | 2021004309 A1 | 1/2021 |

OTHER PUBLICATIONS

"A Database for Research on Detection and Enhancement of Speech Transmitted Over Hf Links" Heitkaemper et al. 2021.
Japanese Office Action for the related Application No. 2024-545989 dated Sep. 2, 2025.

* cited by examiner

SPEECH RECOGNITION USING WORD OR PHONEME TIME MARKERS BASED ON USER INPUT

CROSS REFERENCE TO RELATED APPLICATIONS

This U.S. patent application claims priority under 35 U.S.C. § 119 (e) to U.S. Provisional Application 63/267,436, filed on Feb. 2, 2022. The disclosure of this prior application is considered part of the disclosure of this application and is hereby incorporated by reference in its entirety.

TECHNICAL FIELD

This disclosure relates to speech recognition using word or phoneme time markers based on user input.

BACKGROUND

Automated speech recognition (ASR) systems may operate on computing devices to recognize/transcribe speech spoken by users that query digital assistants to perform operations. Robustness of automatic speech recognition (ASR) systems has significantly improved over the years with the advent of neural network-based end-to-end models, large-scale training data, and improved strategies for augmenting training data. Nevertheless, various conditions such as harsher background noise and competing speech significantly deteriorate performance of ASR systems.

SUMMARY

One aspect of the disclosure provides a computer-implemented method when executed on data processing hardware causes the data processing hardware to perform operations that including receiving an input audio signal captured by a user device. The input audio signal corresponds to target speech of multiple words spoken by a target user and contains background noise in the presence of the user device while the target user spoke the multiple words in the target speech. The operations further include receiving a sequence of time markers input by the target user in cadence with the target user speaking the multiple words in the target speech, correlating the sequence of time markers with the input audio signal to generate enhanced audio features that separate the target speech from the background noise in the input audio signal, and processing, using a speech recognition model, the enhanced audio features to generate a transcription of the target speech.

Implementations of the disclosure may include one or more of the following optional features. In some implementations, correlating the sequence of time markers with the input audio signal includes computing, using the sequence of time markers, a sequence of word time stamps each designating a respective time corresponding to one of the multiple words in the target speech that was spoken by the target user, and separating, using the sequence of computed word time stamps, the target speech from the background noise in the input audio signal to generate the enhanced audio features. In these implementations, separating the target speech from the background noise in the input audio signal may include removing, from inclusion in the enhanced audio features, the background noise. Additionally or alternatively, separating the target speech from the background noise in the input audio signal includes designating the sequence of word time stamps to corresponding audio segments of the enhanced audio features to differentiate the target speech from the background noise.

In some examples, receiving the sequence of time markers input by the target user includes receiving each time marker in the sequence of time markers in response to the target user touching or pressing a predefined region of the user device or another device in communication with the data processing hardware. Here, the predefined region of the user device or the other device may include a physical button disposed on the user device or the other device. Additionally or alternatively, wherein the predefined region of the user device or the other device includes a graphical button displayed on a graphical user interface of the user device. In some implementations, receiving the sequence of time markers input by the target user includes receiving each time marker in the sequence of time markers in response to a sensor in communication with the data processing hardware detecting the target user performing a predefined gesture.

In some examples, a number of time markers in the sequence of time markers input by the user is equal to a number of the multiple words spoken by the target user in the target speech. In some implementations, the data processing hardware resides on the user device associated with the target user. Additionally or alternatively, the data processing hardware resides on a remote server in communication with the user device associated with the target user. In some examples, the background noise in contained in the input audio signal includes competing speech spoken by one or more other users. In some implementations, the target speech spoken by the target user includes a query directed toward a digital assistant executing on the data processing hardware. Here, the query specifies an operation for the digital assistant to perform.

Another aspect of the disclosure provides a system including data processing hardware and memory hardware in communication with the data processing hardware. The memory hardware stores instructions that when executed by the data processing hardware cause the data processing hardware to perform operations that include receiving an input audio signal captured by a user device. The input audio signal corresponds to target speech of multiple words spoken by a target user and contains background noise in the presence of the user device while the target user spoke the multiple words in the target speech. The operations further include receiving a sequence of time markers input by the target user in cadence with the target user speaking the multiple words in the target speech, correlating the sequence of time markers with the input audio signal to generate enhanced audio features that separate the target speech from the background noise in the input audio signal, and processing, using a speech recognition model, the enhanced audio features to generate a transcription of the target speech.

This aspect may include one or more of the following optional features. In some implementations, correlating the sequence of time markers with the input audio signal includes computing, using the sequence of time markers, a sequence of word time stamps each designating a respective time corresponding to one of the multiple words in the target speech that was spoken by the target user, and separating, using the sequence of computed word time stamps, the target speech from the background noise in the input audio signal to generate the enhanced audio features. In these implementations, separating the target speech from the background noise in the input audio signal may include removing, from inclusion in the enhanced audio features, the background noise. Additionally or alternatively, separating the target speech from the background noise in the input audio signal includes designating the sequence of word time stamps to corresponding audio segments of the enhanced audio features to differentiate the target speech from the background noise.

In some examples, receiving the sequence of time markers input by the target user includes receiving each time marker in the sequence of time markers in response to the target user touching or pressing a predefined region of the user device or another device in communication with the data processing hardware. Here, the predefined region of the user device or the other device may include a physical button disposed on the user device or the other device. Additionally or alternatively, wherein the predefined region of the user device or the other device includes a graphical button displayed on a graphical user interface of the user device. In some implementations, receiving the sequence of time markers input by the target user includes receiving each time marker in the sequence of time markers in response to a sensor in communication with the data processing hardware detecting the target user performing a predefined gesture.

In some examples, a number of time markers in the sequence of time markers input by the user is equal to a number of the multiple words spoken by the target user in the target speech. In some implementations, the data processing hardware resides on the user device associated with the target user. Additionally or alternatively, the data processing hardware resides on a remote server in communication with the user device associated with the target user. In some examples, the background noise in contained in the input audio signal includes competing speech spoken by one or more other users. In some implementations, the target speech spoken by the target user includes a query directed toward a digital assistant executing on the data processing hardware. Here, the query specifies an operation for the digital assistant to perform.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Robustness of automatic speech recognition (ASR) systems has significantly improved over the years with the advent of neural network-based end-to-end models, large-scale training data, and improved strategies for augmenting training data. Nevertheless, background interference can significantly deteriorate the ability of ASR systems to accurately recognize speech directed toward the ASR system. Background interference can be broadly classified into background noise and competing speech. While separate ASR models may be trained to handle each of these background interference groups in isolation, the difficulty in maintaining multiple task/condition-specific ASR models and switching between the models on the fly during use is not practical.

Background noise with non-speech characteristics is usually well handled using data augmentation strategies like multi-style training (MTR) of the ASR models. Here, a room simulator is used to add noise to the training data, which is then carefully weighted with clean data during training to get a good balance in performance between clean and noisy conditions. As a result, large scale ASR models are robust to moderate levels of non-speech noise. However, background noise can still affect performance of backend speech systems in the presence of low signal-to-noise ratio (SNR) conditions.

Unlike non-speech background noise, competing speech is quite challenging for ASR models that are trained to recognize a single speaker. Training ASR models with multi-talker speech can pose problems in itself, since it is hard to disambiguate which speaker to focus on during inference. Using models that recognize multiple speakers is also sub-optimal since it is hard to know ahead of time how many users to support. Furthermore, such multi-speaker models typically have degraded performance in single-speaker settings, which is undesirable.

These aforementioned classes of background interference have typically been addressed in isolation of one another, each using separate modeling strategies. Speech separation has received a lot of attention in the recent literature using techniques like deep clustering, permutation invariant training, and using speaker embedding. When using speaker embedding, the target speaker of interest is assumed to be known a priori. When the target speaker embedding is unknown, blind speaker separation involves using the input audio waveform of mixed speech itself and performing unsupervised learning techniques by clustering similar looking audio features into the same bucket. However, due to the heavy ill-posed nature of this inverse problem, the audio-only recovered speaker sets are often noisy and still contain cross-speech artifacts, e.g., audio-only speech in a speaker set associated with a first speaker may contain speech spoken by a different second speaker. Techniques developed for speaker separation have also been applied to remove non-speech noise, with modifications to the training data.

Figure 1:
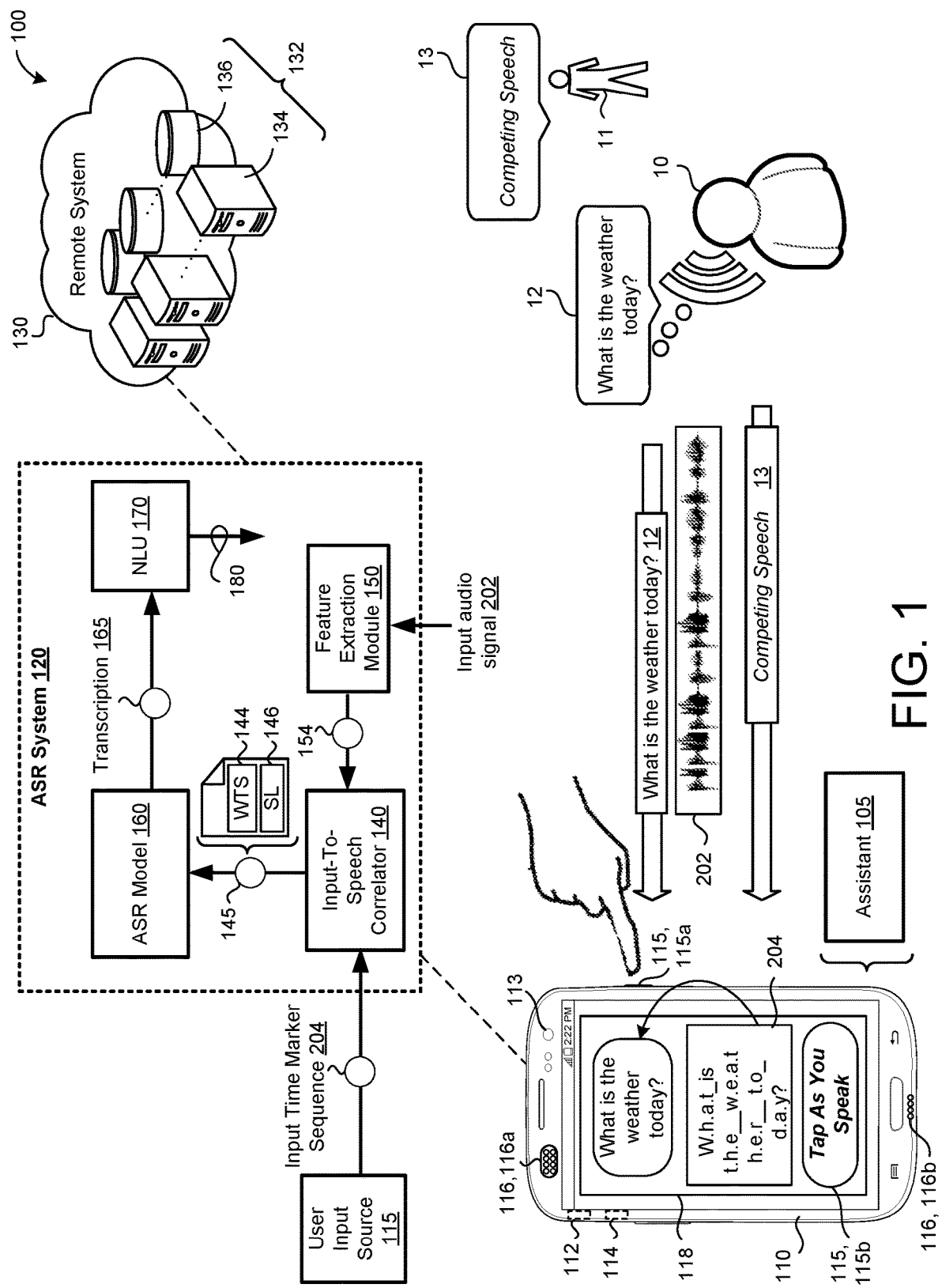
FIG. 1 is a schematic view of an example system for boosting automated speech recognition accuracy for transcribing target speech using a sequence of time markers input by a user.

Referring to FIG. 1, in some implementations, a system 100 includes a user 10 communicating a spoken target speech 12 to a speech-enabled user device 110 (also referred to as a device 110 or a user device 110) in a speech environment. The target user 10 (i.e., speaker of the utterance 12) may speak the target speech 12 as a query or a command to solicit a response from a digital assistant 105 executing on the user device 110. The device 110 is configured to capture sounds from one or more users 10, 11 within the speech environment. Here, the audio sounds may refer to a spoken utterance 12 by the user 10 that functions as an audible query, a command/operation for the digital assistant 105, or an audible communication captured by the device 110. The digital assistant 105 may field the query for the command by answering the query and/or causing the command to be performed.

The device 110 may correspond to any computing device associated with the user 10 and capable of receiving noisy audio signals 202. Some examples of user devices 110 include, but are not limited to, mobile devices (e.g., mobile phones, tablets, laptops, etc.), computers, wearable devices (e.g., smart watches), smart appliances, internet of things (IoT) devices, and smart speakers, etc. The device 110 includes data processing hardware 112 and memory hardware 114 in communication with the data processing hardware 112 and storing instructions, that when executed by the data processing hardware 112, cause the data processing hardware 112 to perform one or more operations. In some examples, an automated speech recognition (ASR) system 120 executes on the data processing hardware 112. Additionally or alternatively, the digital assistant 105 may execute on the data processing hardware 112.

The device 110 further includes an audio subsystem with an audio capturing device (e.g., a microphone) 116 for capturing and converting spoken utterances 12 within the speech environment into electrical signals and a speech output device (e.g., an audio speaker) 117 for communicating an audible audio signal. While the device 110 implements a single audio capturing device 116 in the example shown, the device 110 may implement an array of audio capturing devices 116 without departing from the scope of the present disclosure, whereby one or more audio capturing devices 116 in the array may not physically reside on the device 110, but be in communication with the audio subsystem (e.g., peripherals of the device 110). For example, the device 110 may correspond to a vehicle infotainment system that leverages an array of microphones positioned throughout the vehicle.

In the example shown, the ASR system 120 employs an ASR model 160 that processes enhanced speech features 145 to generate a speech recognition result (e.g., transcription) 160 for target speech 12. Described in greater detail below, the ASR system 120 may derive the enhanced speech features 145 from a noisy input audio signal 202 corresponding to the target speech 12 based on a sequence of input time markers 204 (interchangeably referred to as "input time marker sequence 204" or "time marker sequence 204"). The ASR system 120 may further include a natural language understanding (NLU) module 170 that performs semantic interpretation on the transcription 165 of the target speech 12 to identify the query/command directed toward the digital assistant 105. As such, an output 180 from the ASR system 120 may include instructions to fulfill the query/command identified by the NLU module 170.

In some examples, the device 110 is configured to communicate with a remote system 130 (also referred to as a remote server 130) via a network (not shown). The remote system 130 may include remote resources 132, such as remote data processing hardware 134 (e.g., remote servers or CPUs) and/or remote memory hardware 136 (e.g., remote databases or other storage hardware). The device 110 may utilize the remote resources 132 to perform various functionality related to speech processing and/or query fulfillment. The ASR system 120 may reside on the device 110 (referred to as an on-device system) or reside remotely (e.g., reside on the remote system 130) while in communication with the device 110. In some examples, one or more components of the ASR system 120 reside locally or on-device while one or more other components of the ASR system 120 reside remotely. For instance, when a model or other component of the ASR system 120 is rather large in size or includes increased processing requirements, that model or component may reside in the remote system 130. Yet when the device 110 may support the size or the processing requirements of given models and/or components of the ASR system 120, those models and/or components may reside on the device 110 using the data processing hardware 112 and/or the memory hardware 114. Optionally, components of the ASR system 120 may reside on both locally/on-device and remotely. For instance, a first pass ASR model 160 capable of performing streaming speech recognition may execute on the user device 110 while a second pass ASR model 160 that is more computationally intensive than the first pass ASR model 160 may execute on the remote system 130 to rescore speech recognition results generated by the first pass ASR model 160.

Various types of background interference may interfere with the ability of the ASR system 120 to process the target speech 12 that specifies the query or command for the device 110. As aforementioned, the background interference may include competing speech 13 such as utterances 13 other than the target speech 12 spoken by one or more other users 11 that are not directed toward the user device 110 and background noise with non-speech characteristics. In some instances, the background inference could also be caused by device echo corresponding to playback audio output from the user device (e.g., a smart speaker) 110, such as media content or synthesized speech from the digital assistant 105 conveying responses to queries spoken by the target user 10.

In the example shown, the user device 110 captures a noisy audio signal 202 (also referred to as audio data) of the target speech 12 spoken by the user 10 in the presence of background interference emanating from one or more sources other than the user 10. As such, the audio signal 202 also contains the background noise/interference that is in the presence of the user device 110 while the target user 10 spoke the target speech 110. The target speech 12 may correspond to a query directed toward the digital assistant 105 that specifies an operation for the digital assistant 105 to perform. For instance, the target speech 12 spoken by the target user 10 may include the query "What is the weather today?" requesting the digital assistant 105 to retrieve today's weather forecast. Due to the presence of the background interference attributed to at least one of competing speech 13, device echo, and/or non-speech background noise interfering with target speech 12, the ASR model 140 may have difficulty recognizing an accurate transcription of the target speech 12 corresponding to the query "What is the weather today?" in the noisy audio signal 202. A consequence of inaccurate transcriptions 165 output by the ASR model 160 include the NLU module 170 unable to ascertain the actual intent/contents of the query spoken by the target user 10, thereby resulting in the digital assistant 105 failing to retrieve the appropriate response (e.g., today's weather forecast) or any response at all.

To combat background noise/interference in a noisy audio signal 202 that may degrade performance of the ASR model 160 to accurately transcribe target speech 12 of multiple words spoken by a target user 10, implementations herein are directed toward using a sequence of time markers 204 input by the target user 10 in cadence with the target user 10 speaking the multiple words in the target speech 12 as additional context for boosting/improving the accuracy of the transcription 165 output by the ASR model 160. That is, the target user 10 may input a time marker 204 via a user input source 115 each time the user 10 speaks one of the multiple words such that each time marker 204 designates a time at which the user 10 spoke a corresponding one of the multiple words in the target speech 12. Accordingly, a number of time markers 204 input by the user may be equal a number of the multiple words spoken by the target user 10 in the target speech 12. In the example shown, the ASR system 120 may receive a sequence of five (5) time markers 204 associated with the five words "what", "is", "the", "weather", and "today" spoken by the target user 10 in the target speech 12. In some examples, the target user 10 inputs a time marker 204 via the user input source 115 each time the user 10 speaks a syllable occurring in each word of the multiple words such that each time marker 204 designates a time at which the user 10 spoke a corresponding syllable of the multiple words in the target speech 12. Here, a number of time markers 204 input by the user may be equal to a number of the syllables that occur in the multiple words spoken by the target user in the target speech 12. The number of syllables may be equal to or greater than the number of words spoken by the target user 10.

Implementations include the ASR system 120 employing an input-to-speech (ITS) correlator 140 configured to receive, as input, the input time marker sequence 204 input by the target user 10 and initial features 154 extracted from the input audio signal 202 by a feature extraction module 150. The initial features 154 may correspond to parameterized acoustic frames, such as mel frames. For instance, the parameterized acoustic frames may correspond to log-mel fiterbank energies (LFBEs) extracted from the input audio signal 202 and may be represented by a series of time windows/frames. In some examples, the time windows representing the initial features 154 may include a fixed size and a fixed overlap. Implementations are directed toward the ITS correlator 140 correlating the received sequence of time markers 204 and the initial features 154 extracted from the input audio signal 202 to generate enhanced audio features 145 that separate the target speech 12 from the background interference (i.e., the competing speech 13) in the input audio signal 202. Thereafter, the ASR model 160 may process the enhanced audio features 145 generated by the ITS correlator 140 to generate the transcription 165 of the target speech 12. In some configurations, the user device 110 displays the transcription 165 on a graphical user interface 118 of the user device 110.

In some implementations, the ITS correlator 140 correlates the sequence of time markers 204 with the initial features 154 extracted from the input audio signal 202 by using the sequence of time markers 204 to compute a sequence of word time stamps 144 each designating a respective time a corresponding one of the multiple words in the target speech 12 was spoken by the target user 10. In these implementations, the ITS correlator 140 may use the sequence of computed word time stamps 144 to separate the target speech 12 from the background interference (i.e., the competing speech 13) in the input audio signal 202.

In some examples, the ITS correlator 140 separates the target speech 12 from the background interference (i.e., the competing speech 13) by removing, from inclusion in the enhanced audio features 145, the background interference (i.e., the competing speech 13). For instance, the background interference may be removed by filtering out time windows from the initial features 154 that have not been designated/assigned a word time stamp 144 from the sequence of word time stamps 144. In other examples, the ITS correlator 140 separates the target speech 12 from the background interference (i.e., the competing speech 13) by designating the sequence of word time stamps 144 to corresponding audio segments of the enhanced audio features 145 to differentiate the target speech 12 from the background interference. For instance, the enhanced audio features 145 may correspond to the initial features 154 extracted from the input audio signal 202 that are represented by the time windows/frames, whereby the word time stamps 144 are assigned to corresponding time windows from the initial features 154 to designate the timing of each word.

In some examples, the ITS correlator 140 is capable of performing blind speaker diarization on the raw initial features 154 by extracting speaker embeddings and grouping similar speaker embeddings extracted from the initial features 154 into clusters. Each cluster of speaker embeddings may be associated with a corresponding speaker label associated with a different respective speaker. The speaker embeddings may include d-vectors or i-vectors. As such, the ITS correlator 140 may assign each enhanced audio feature 145 to a corresponding speaker label 146 to convey speech spoken by different speakers in the input audio signal 202.

The ITS correlator 140 may use the following Equation to correlate each input time marker 204 with each word spoken by the target user 10 in target speech.

$$\text{speaker\_1\_word\_data} = \text{SPEECH\_TO\_WORD}(\text{speaker\_1\_waveform}) \quad (1)$$

where the SPEECH_TO_WORD describes an ordered set of time markers 204 (e.g., in milliseconds) that correlate with the words spoken by the target user 10 in the target speech 12.

In a multi-speaker scenario, the ITS correlator 140 is capable of receiving respective input time markers sequences 204 from at least two different users 10, 11 and initial features 154 extracted from an input audio signal 202 containing speech spoken by each of the at least two different users 10, 11. Here, the ITS correlator 140 may apply Eq. 1 to correlate each input time marker 204 from each input time marker sequence with words spoken by the different users 10, 11 and thereby generate enhanced audio features 145 that effectively separates the speech spoken by the at least two different users 10, 11. That is, the ITS correlator 140 identifies an optimal correlation between sequences of input time markers 204 and initial features 154 extracted from the noisy input audio signal 202 by performing point-by-point time difference matching. Of course, only one of the different users 10, 11 may input a respective sequence of time markers 204, whereby the ITS correlator 140 can interpolate which words were spoken in speech 13 from the user 11 that did not input any time markers after using the sequence of time markers 204 input by the target user 10 to generate enhanced audio features 145 that separates the target speech 12 from the other speech 13.

Figure 2:
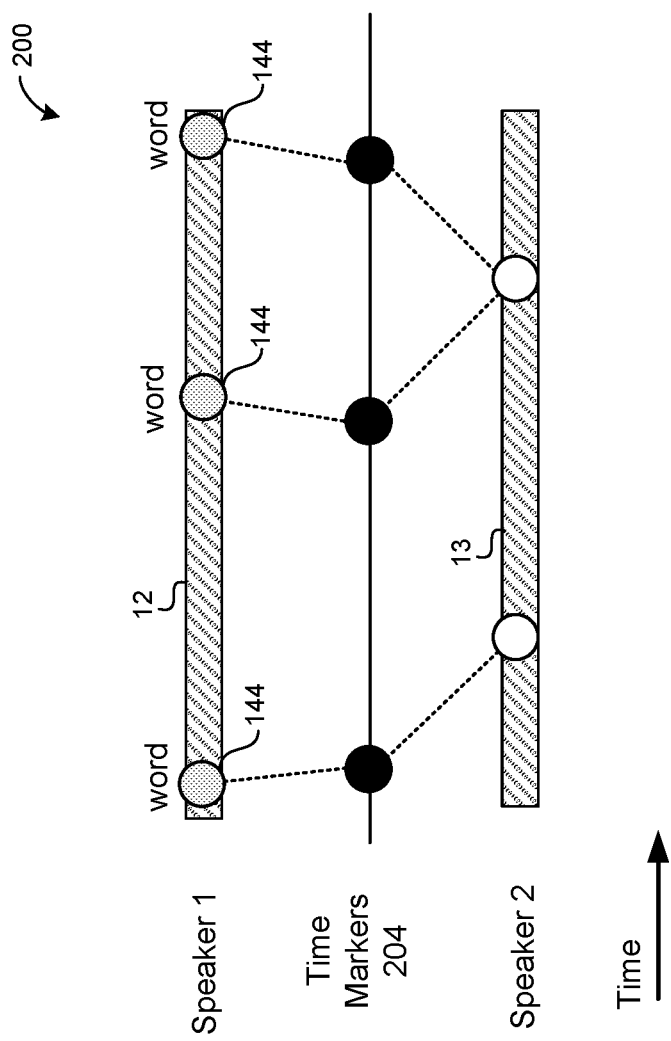
FIG. 2 is an example plot showing correlation between a sequence of input time markers and word time markers spoken in target and competing speech spoken by different speakers.

FIG. 2 shows a plot 200 depicting the ITS correlator 140 performing point-by-point time difference matching between a sequence of time markers 204 input by a first speaker (Speaker #1) and a noisy audio signal 202 containing target speech 12 of multiple words spoken by the first speaker in the presence of competing speech 13 of multiple other words spoken by a different second speaker (Speaker #2). The x-axis of the plot 200 depicts time increasing from left to right. The ITS correlator 140 may compute a mean time difference between each time marker 204 in the sequence input by Speaker #1 and a closest word time stamp 144 associated with locations of spoken words in the mixed audio signal 202 containing both the target speech 12 and the competing speech 13. The plot 200 shows that the word time stamps 144 indicating the words spoken by Speaker #1 in the target speech 12 are associated with a smaller mean time difference between the input sequence of time markers 204 than the word time stamps indicating the other words spoken by Speaker #2 in the competing speech 13. Accordingly, the ITS correlator 140 may generate enhanced speech features 154 using any of the techniques described above, whereby the enhanced speech features 154 effectively separate the target speech 12 from the competing speech 13 to permit the downstream ASR model 160 to generate a transcription 165 of the target speech 12 and ignore the competing speech 13 in the noisy input audio signal 202.

The target user 10 may provide the sequence of time markers 204 using various techniques. The target user 10 may opportunistically provide time markers 204 when the target user 10 is in a noisy environment (e.g., a subway, an office, etc.) where competing speech 13 is susceptible to being captured by the user device 110 when the target user 10 is invoking the digital assistant 105 via target speech 12. The ASR system 120, and more particularly the ITS correlator 140, may receive the sequence of time markers 204 input by the user 10 via a user input source 115. The user input source 115 may permit the user 10 to input the sequence of time markers 204 in cadence with multiple words and/or syllables spoken by the user 10 in target speech 12 the ASR model 140 is to recognize.

In some examples, the ASR system 120 receives each time marker 204 in response to the target user 10 touching or pressing a predefined region 115 of the user device 110 or another device in communication with the user device 110. Here, the predefined region touched/pressed by the user 10 serves as the user input source 115 and may include a physical button 115a of the user device 110 (e.g., a power button) or a physical button 115a of a peripheral device (e.g., a button on a steering wheel when the user device 110 is a vehicle infotainment system) (e.g., a button/key on a keyboard when the user device 110 is desktop computer). The predefined region 115 could also include a capacitive touch region disposed on the user device 110 (e.g., a capacitive touch region on headphones). Without departing from the scope of the present disclosure, the predefined region 115 touched/pressed by the user 10 and serving as the user input source 115 may include a graphical button 115b displayed on a graphical user interface 118 of the user device 110. For instance, in the example shown, a graphical button 115b labeled "touch as you speak" is displayed on the graphical user interface 118 of the user device 110 to permit the user 10 to tap the graphical button 115b in unison with each word spoken by the user 10 in the target speech 12.

The ASR system 120 may also receive each time marker 204 in response to a sensor 113 detecting the target user 10 performing a predefined gesture. The sensor 113 may include an array of or more sensors of the user device 110 or in communication with the user device 110. For instance, the sensor 113 may include an image sensor (e.g., camera), a radar/lidar sensor, a motion sensor, a capacitance sensor, a pressure sensor, an accelerometer, and/or a gyroscope. For instance, an image sensor 113 may capture streaming video of the user performing a predefined gesture such as making a first each time the user 10 speaks a word/syllable in target speech 12. Similarly, the user may perform other predefined gestures such as squeezing the user device that may be detected by a capacitance or pressure sensor, or shaking the user device that may be detected by an accelerometry and/or gyroscope.

In some additional examples, the sensor includes the microphone 116b for detecting audible sounds that correspond to input time markers 204 input by the user 10 while speaking each word in target speech 12. For instance, the user 10 may clap his/her hand, snap fingers, knock on a surface supporting the user device 110, or produce some other audible sounds in cadence with speaking the words in the target speech that may be captured the microphone 116b.

Figure 3:
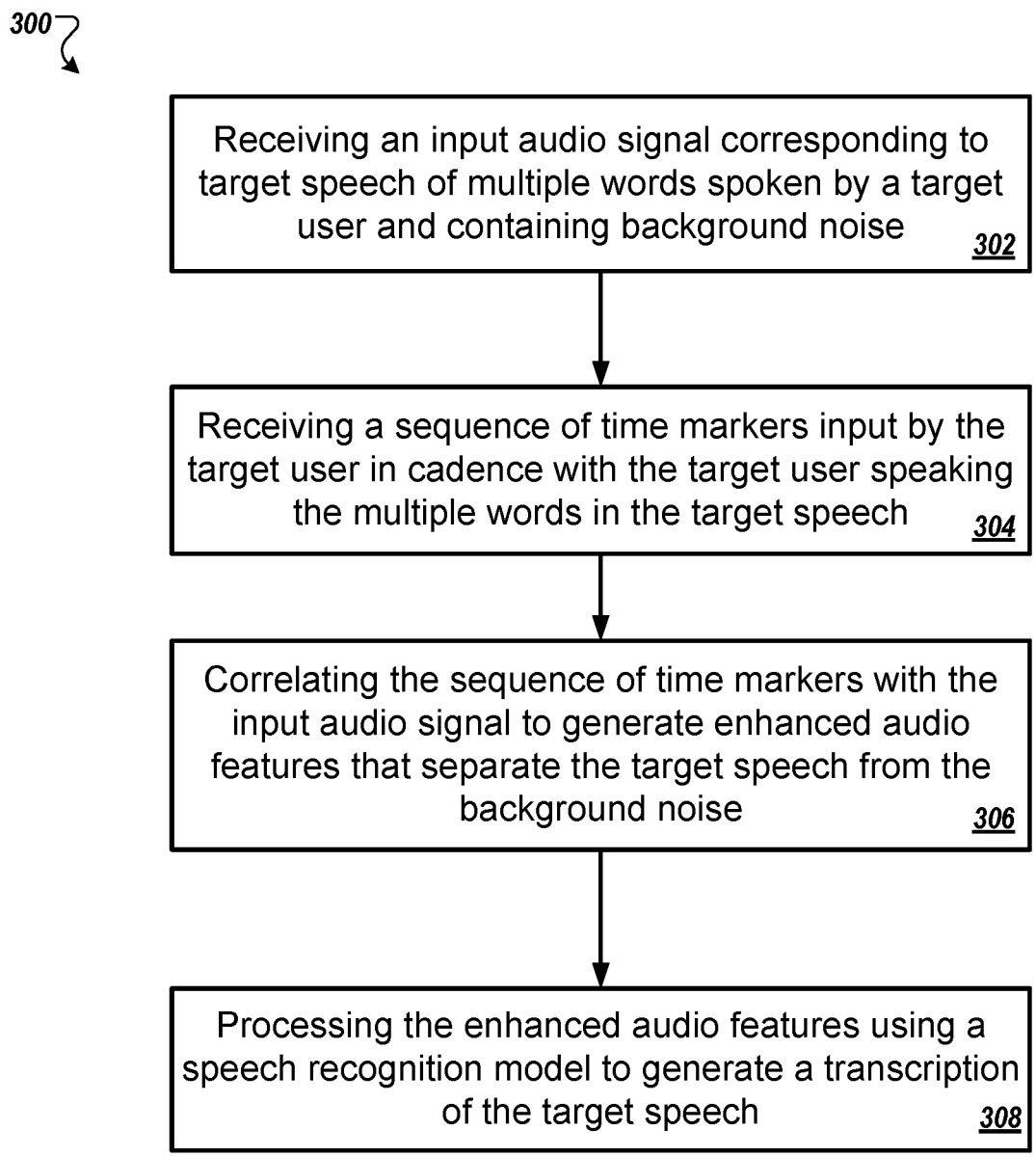
FIG. 3 is a flowchart of an example arrangement of operations for a method of using input time markers to boost/improve speech recognition on target speech contained in a noisy audio signal.

FIG. 3 is an example arrangement of operations for a method 300 of boosting/improving accuracy of speech recognition by using a sequence of time markers 204 input by a target user 10 in cadence with the target user 10 speaking each of multiple words in target speech 12. The target speech 12 may include an utterance of a query directed toward a digital assistant application 105 that requests the digital assistant application 105 to perform an operation specified by the query in the target speech 12. The method 300 includes a computer-implemented method that executes on data processing hardware 410 (FIG. 4) by performing the example arrangement of operations stored on memory hardware 420 (FIG. 4) in communication with the data processing hardware 410. The data processing hardware 410 may include the data processing hardware 112 of the user device 110 or the data processing hardware 134 of the remote system 130. The memory hardware 420 may include the memory hardware 114 of the user device 110 or the memory hardware 136 of the remote system 130.

At operation 302, the method 300 includes receiving an input audio signal 202 captured by a user device 110. Here, the input audio signal 202 corresponds to target speech 12 of multiple words spoken by a target user 10 and containing background noise in the presence of the user device 110 while the target user 10 spoke the multiple words in the target speech 12. The background noise may include competing speech 13 spoken by one or more other users 11 in the presence of the user device 110 when the target speech 12 is spoken by the target user 10.

At operation 304, the method 300 includes receiving a sequence of time markers 204 input by the target user 10 in cadence with the target user 10 speaking the multiple words in the target speech 12. Here, each time marker 204 in the sequence of time markers 204 may be received in response to the target user 10 touching or pressing a predefined region 115 of the user device 110 or another device. In some examples, a number of time markers 204 in the sequence of time markers 204 input by the target user 10 is equal to a number of the multiple words spoken by the target user 10 in the target speech 12.

At operation 306, the method 300 also includes correlating the sequence of time markers 204 with the input audio signal 202 to generate enhanced audio features 145 that separate the target speech 12 from the background noise 13 in the input audio signal 202. At operation 308, the method 300 includes processing, using a speech recognition model 160, the enhanced audio features 145 to generate a transcription 165 of the target speech 12.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 4:
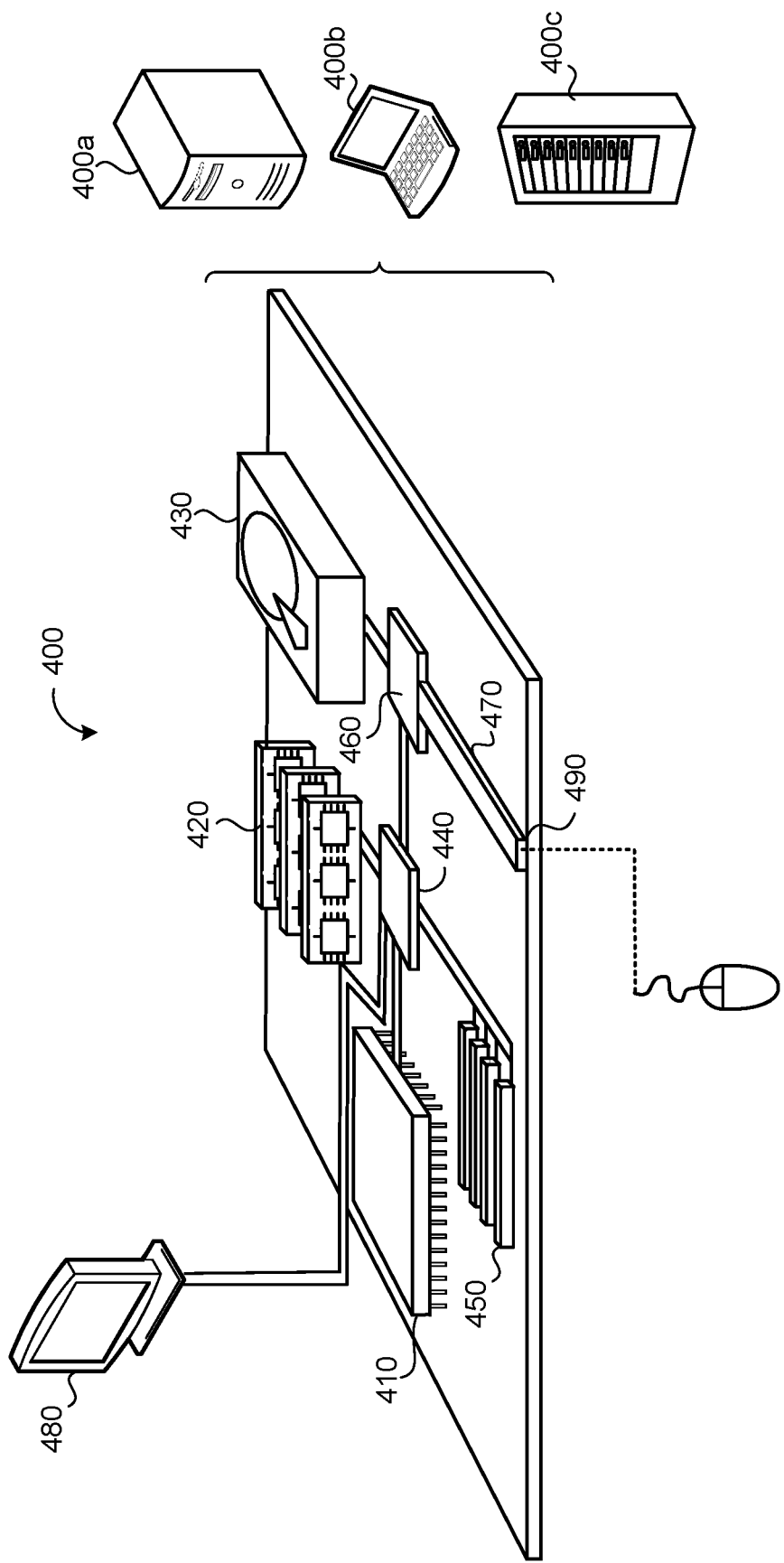
FIG. 4 is a schematic view of an example computing device that may be used to implement the systems and methods described herein.

FIG. 4 is schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410, memory 420, a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:
    receiving an input audio signal captured by a user device, the input audio signal corresponding to target speech of multiple words spoken by a target user and containing background noise in the presence of the user device while the target user spoke the multiple words in the target speech;
    receiving a sequence of time markers input by the target user as the target speaker speaks the target speech and in cadence with the target user speaking the multiple words in the target speech, wherein each time marker in the sequence of time markers is received responsive to the user device detecting, via a sensor, a respective user input indication from the target speaker directed toward the user device;
    correlating the sequence of time markers with the input audio signal to generate enhanced audio features that separate the target speech from the background noise in the input audio signal; and
    processing, using a speech recognition model, the enhanced audio features to generate a transcription of the target speech.

2. The computer-implemented method of claim 1, wherein correlating the sequence of time markers with the input audio signal comprises:
    computing, using the sequence of time markers, a sequence of word time stamps each designating a respective time corresponding to one of the multiple words in the target speech that was spoken by the target user; and
    separating, using the sequence of computed word time stamps, the target speech from the background noise in the input audio signal to generate the enhanced audio features.

3. The computer-implemented method of claim 2, wherein separating the target speech from the background noise in the input audio signal comprises removing, from inclusion in the enhanced audio features, the background noise.

4. The computer-implemented method of claim 2, wherein separating the target speech from the background noise in the input audio signal comprises designating the sequence of word time stamps to corresponding audio segments of the enhanced audio features to differentiate the target speech from the background noise.

5. The computer-implemented method of claim 1, wherein receiving the sequence of time markers input by the target user comprises receiving each time marker in the sequence of time markers in response to the target user touching or pressing a predefined region of the user device or another device in communication with the data processing hardware.

6. The computer-implemented method of claim 5, wherein the predefined region of the user device or the other device comprises a physical button disposed on the user device or the other device.

7. The computer-implemented method of claim 5, wherein the predefined region of the user device or the other device comprises a graphical button displayed on a graphical user interface of the user device.

8. The computer-implemented method of claim 1, wherein receiving the sequence of time markers input by the target user comprises receiving each time marker in the sequence of time markers in response to a sensor in communication with the data processing hardware detecting the target user performing a predefined gesture.

9. The computer-implemented method of claim 1, wherein a number of time markers in the sequence of time markers input by the user is equal to a number of the multiple words spoken by the target user in the target speech.

10. The computer-implemented method of claim 1, wherein the data processing hardware resides on the user device associated with the target user.

11. The computer-implemented method of claim 1, wherein the data processing hardware resides on a remote server in communication with the user device associated with the target user.

12. The computer-implemented method of claim 1, wherein the background noise in contained in the input audio signal comprises competing speech spoken by one or more other users.

13. The computer-implemented method of claim 1, wherein the target speech spoken by the target user comprises a query directed toward a digital assistant executing on the data processing hardware, the query specifying an operation for the digital assistant to perform.

14. A system comprising:
    data processing hardware; and memory hardware in communication with the data processing hardware, the memory hardware storing instructions that when executed on the data processing hardware cause the data processing hardware to perform comprising:
- receiving an input audio signal captured by a user device, the input audio signal corresponding to target speech of multiple words spoken by a target user and containing background noise in the presence of the user device while the target user spoke the multiple words in the target speech;
- receiving a sequence of time markers input by the target user as the target speaker speaks the target speech and in cadence with the target user speaking the multiple words in the target speech, wherein each time marker in the sequence of time markers is received responsive to the user device detecting, via a sensor, a respective user input indication from the target speaker directed toward the user device;
- correlating the sequence of time markers with the input audio signal to generate enhanced audio features that separate the target speech from the background noise in the input audio signal; and
- processing, using a speech recognition model, the enhanced audio features to generate a transcription of the target speech.

15. The system of claim 14, wherein correlating the sequence of time markers with the input audio signal comprises:
- computing, using the sequence of time markers, a sequence of word time stamps each designating a respective time corresponding to one of the multiple words in the target speech that was spoken by the target user; and
- separating, using the sequence of computed word time stamps, the target speech from the background noise in the input audio signal to generate the enhanced audio features.

16. The system of claim 15, wherein separating the target speech from the background noise in the input audio signal comprises removing, from inclusion in the enhanced audio features, the background noise.

17. The system of claim 15, wherein separating the target speech from the background noise in the input audio signal comprises designating the sequence of word time stamps to corresponding audio segments of the enhanced audio features to differentiate the target speech from the background noise.

18. The system of claim 14, wherein receiving the sequence of time markers input by the target user comprises receiving each time marker in the sequence of time markers in response to the target user touching or pressing a predefined region of the user device or another device in communication with the data processing hardware.

19. The system of claim 18, wherein the predefined region of the user device or the other device comprises a physical button disposed on the user device or the other device.

20. The system of claim 18, wherein the predefined region of the user device or the other device comprises a graphical button displayed on a graphical user interface of the user device.

21. The system of claim 14, wherein receiving the sequence of time markers input by the target user comprises receiving each time marker in the sequence of time markers in response to a sensor in communication with the data processing hardware detecting the target user performing a predefined gesture.

22. The system of claim 14, wherein a number of time markers in the sequence of time markers input by the user is equal to a number of the multiple words spoken by the target user in the target speech.

23. The system of claim 14, wherein the data processing hardware resides on the user device associated with the target user.

24. The system of claim 14, wherein the data processing hardware resides on a remote server in communication with the user device associated with the target user.

25. The system of claim 14, wherein the background noise in contained in the input audio signal comprises competing speech spoken by one or more other users.

26. The system of claim 14, wherein the target speech spoken by the target user comprises a query directed toward a digital assistant executing on the data processing hardware, the query specifying an operation for the digital assistant to perform.

* * * * *